United States Patent
Subramoney et al.

(10) Patent No.: US 7,197,521 B2
(45) Date of Patent: *Mar. 27, 2007

(54) METHOD AND SYSTEM PERFORMING CONCURRENTLY MARK-SWEEP GARBAGE COLLECTION INVOKING GARBAGE COLLECTION THREAD TO TRACK AND MARK LIVE OBJECTS IN HEAP BLOCK USING BIT VECTOR

(75) Inventors: Sreenivas Subramoney, Palo Alto, CA (US); Richard Hudson, Florence, MA (US)

(73) Assignee: Intel Corporation, Santa Clara, CA (US)

( * ) Notice: Subject to any disclaimer, the term of this patent is extended or adjusted under 35 U.S.C. 154(b) by 511 days.

This patent is subject to a terminal disclaimer.

(21) Appl. No.: 10/719,443

(22) Filed: Nov. 21, 2003

(65) Prior Publication Data

US 2005/0114413 A1    May 26, 2005

(51) Int. Cl.
G06F 17/30   (2006.01)
G06F 17/00   (2006.01)
G06F 9/45    (2006.01)
G06F 12/00   (2006.01)

(52) U.S. Cl. .................. 707/206; 707/103 R; 717/148; 711/170

(58) Field of Classification Search .................... 707/1, 707/100, 103 R–103 Y, 200, 206; 717/114, 717/116, 142, 148, 165; 711/133, 170–173, 711/159–160, 165

See application file for complete search history.

(56) References Cited

U.S. PATENT DOCUMENTS 5,873,105 A * 2/1999 Tremblay et al. ........... 707/206
6,055,612 A * 4/2000 Spertus et al. .............. 711/165

(Continued)

FOREIGN PATENT DOCUMENTS

| EP | 1349077 | * 10/2003 | ...................... 12/2 |
| EP | 1387273 | * 2/2004  | ...................... 12/2 |
| GB | 2345355 | * 7/2000  | ...................... 12/2 |
| GB | 2405506 | * 3/2005  | ...................... 11/34 |
| WO | WO 00/60469 | * 10/2000 | ...................... 12/2 |
| WO | WO 01/88713 | * 11/2001 | |

OTHER PUBLICATIONS

Chia-Tien Dan Lo et al. "A multithreaded concurrent garbage collector parallelizing the new instruction in Java", proceedings of the internatinal parallel and distributed processing symposium, 2002, pp. 1-6.*

(Continued)

Primary Examiner—Srirama Channavajjala
(74) Attorney, Agent, or Firm—Guojun Zhou

(57) ABSTRACT

An arrangement is provided for using bit vector toggling to achieve concurrent mark-sweep garbage collection in a managed runtime system. A heap may be divided into a number of heap blocks. Each heap block may contain a mark bit vector pointer, a sweep bit vector pointer, and two bit vectors of which one may be initially pointed to by the mark bit vector pointer and used for marking and the other may be initially pointed to by the sweep bit vector pointer and used for sweeping. At the end of the marking phase for a heap block, the bit vector used for marking and the bit vector used for sweeping may be toggled so that marking phase and sweeping phase may proceed concurrently and both phases may proceed concurrently with mutators.

28 Claims, 9 Drawing Sheets

U.S. PATENT DOCUMENTS

| | | | | |
|---|---|---|---|---|
| 6,065,020 | A * | 5/2000 | Dussud | 707/206 |
| 6,081,665 | A * | 6/2000 | Nilsen et al. | 717/116 |
| 6,098,089 | A * | 8/2000 | O'Connor et al. | 718/104 |
| 6,317,869 | B1 * | 11/2001 | Adl-Tabatabai et al. | 717/132 |
| 6,321,240 | B1 * | 11/2001 | Chilimbi et al. | 707/206 |
| 6,324,631 | B1 * | 11/2001 | Kuiper | 711/170 |
| 6,339,779 | B1 * | 1/2002 | Houldsworth | 707/206 |
| 6,341,342 | B1 | 1/2002 | Thompson et al. | |
| 6,374,286 | B1 * | 4/2002 | Gee et al. | 718/108 |
| 6,502,110 | B1 | 12/2002 | Houldsworth | |
| 6,529,919 | B1 * | 3/2003 | Agesen et al. | 707/206 |
| 6,560,774 | B1 | 5/2003 | Gordon et al. | |
| 6,594,749 | B1 * | 7/2003 | Czajkowski | 711/170 |
| 6,622,226 | B1 * | 9/2003 | Dussud | 711/159 |
| 6,643,672 | B1 | 11/2003 | Lebel | |
| 6,826,583 | B1 * | 11/2004 | Flood et al. | 707/206 |
| 7,043,509 | B2 | 5/2006 | Detlefs | |
| 7,058,781 | B2 | 6/2006 | Detlefs | |
| 7,069,280 | B2 * | 6/2006 | Garthwaite | 707/206 |
| 7,089,273 | B2 | 8/2006 | Wu et al. | |
| 2002/0120428 | A1 * | 8/2002 | Christiaens | 702/186 |
| 2002/0147899 | A1 * | 10/2002 | Lewis | 711/170 |
| 2002/0194421 | A1 * | 12/2002 | Berry et al. | 711/100 |
| 2003/0084265 | A1 * | 5/2003 | Heller et al. | 711/170 |
| 2003/0212719 | A1 * | 11/2003 | Yasuda et al. | 707/206 |
| 2004/0039759 | A1 | 2/2004 | Detlefs et al. | |
| 2004/0073764 | A1 * | 4/2004 | Andreasson | 711/170 |
| 2005/0027761 | A1 | 2/2005 | Wu et al. | |
| 2005/0138294 | A1 * | 6/2005 | Serrano et al. | 711/137 |
| 2005/0138329 | A1 * | 6/2005 | Subramoney et al. | 712/207 |
| 2005/0198088 | A1 * | 9/2005 | Subramoney et al. | 707/206 |

OTHER PUBLICATIONS

Yoav Ossia et al. "mostly concurrent compaction for mark-sweep GC", proceedings of the 4th internatinal symposium on memory management, 2004, pp. 25-36.*

Abhay Vardhan et al. "using passive object garbage collection algorithms for garbage collection of active objects", ISMM '02, 2002.*

Dykstra,L et al. "an analysis of the garbage collection performance in sun's hotspot Java virtual machine", performance, computing and comuniations conference, 2002, IEEE, 2002, pp. 335-339.*

Srisa-An,W et al. scalable hardware-algorithm for mark-sweep garbage collection, proceedings of the 26th Euromicro conference, 2000, vol. 1, pp. 274-281.*

Ladin,R et al. "garbage collection of a distributed heap", proceedings of the 12th international conference on distributed computing systems, 1992, pp. 708-715.*

Witawas Srisa-An, et al. "a performance analysis of the active memory system", proceedings 2001, internatinal conference on computer design, ICCD, 2001, pp. 493-496.*

David Detlefs et al. "concurrent remembered set refinement in generational garbage collection", proceedings of the USENIX Java VM '02 conference, 2002, 11 pages.*

*Oxford English Dictionary*, 2nd Edition 1989, "Repoint".

Pending U.S. Appl. No.: 10/793,707 filed Mar. 3, 2004 inventor: Subramoney, Office Action dated Sep. 19, 2006.

Abduallahi, Saleh E., et al., "Garbage Collecting the Internet: A Survey of Distributed Garbage Collection", Abdullahi et al.: *Garbage Collecting the Internet: A Survey of Distributed Garabage Collection: ACM Computing Surveys*, vol. 30, pp. 330-373, Sep. 1998.

Jones, Richard, et al., Jones et al.: *Garbage Collection Algorithms for Automatic Dynamic Memory Management*: Ed John Wiley & Sons, Chichester, 1996.

Soman, Sunil, "Modern Garbage Collection for Virtual Machines", Soman: *Modern Garbage Collection for Virtual Machines*: Univ of AC, Santa Barbara, Computer Science Dep't. Dec. 6, 2003: http://www.cs.ucsb.edu/~sunils/pubs/mae.pdf>.

Pending U.S. Appl. No. 10/793,707 filed Mar. 3, 2004 inventor: Subramoney Office Action dated Sep. 19, 2006.

* cited by examiner

METHOD AND SYSTEM PERFORMING CONCURRENTLY MARK-SWEEP GARBAGE COLLECTION INVOKING GARBAGE COLLECTION THREAD TO TRACK AND MARK LIVE OBJECTS IN HEAP BLOCK USING BIT VECTOR

BACKGROUND

1. Field

The present invention relates generally to managed runtime environments and, more specifically, to bit vector toggling for concurrent mark-sweep garbage collection.

2. Description

The function of garbage collection, i.e., automatic reclamation of computer storage, is to find data objects that are no longer in use and make their space available for reuse by running programs. Garbage collection is important to avoid unnecessary complications and subtle interactions created by explicit storage allocation, to reduce the complexity of program debugging, and thus to promote fully modular programming and increase software application portability. Because of its importance, garbage collection is becoming an integral part of managed runtime environments.

The basic functioning of a garbage collector may comprise three phases. In the first phase, all direct references to objects from currently running programs may be identified. These references are called roots, or together a root set, and a process of identifying all such references may be called root set enumeration. In the second phase, all objects reachable from the root set may be searched since these objects may be used in the future. An object that is reachable from any reference in the root set is considered a live object (a reference in the root set is a reference to a live object). An object reachable from a live object is also live. The process of finding all live objects reachable from the root set may be referred to as live object tracing (or marking and scanning). An object that is not live is considered a garbage object. In the third phase, storage space of garbage objects may be reclaimed (garbage reclamation). This phase may be conducted either by a garbage collector or by a running application (usually called a mutator). In practice, these three phases, especially the last two phases, may be functionally or temporally interleaved and a reclamation technique may be strongly dependent on a live object tracing technique.

One garbage collection technique is called mark-sweep collection. Mark-sweep garbage collectors are named for methods that implement two garbage collection phases: live object tracing and garbage reclamation. In the live object tracing phase, live objects are distinguished from garbage by tracing, that is, starting at the root set and actually traversing the graph of reachable data structures. In mark-sweep garbage collection, the objects that are reached from the root set are marked in some way, either by altering bits within the objects, or perhaps by recording them in a bitmap or some other kind of table (this process may be referred to as a marking phase). Once the live objects are marked, i.e., have been made distinguishable from the garbage objects, storage space is swept, that is, exhaustively examined, to find all of the unmarked objects (garbage) and reclaim their space. The reclaimed objects are usually linked onto one or more free lists so that they are accessible to the allocation routines. The storage space sweeping may be referred to as a sweeping phase. The sweeping phase may be conducted by a garbage collector or a mutator.

Usually, mark-sweep garbage collection cannot proceed in parallel with actual execution of mutators. All mutators may have to be stopped for a mark-sweep garbage collector to obtain a root set and to distinguish live objects from garbage (a garbage collector that stops execution of all mutators is also called a "stop-the-world" garbage collector). A garbage collection technique that stops the execution of mutators may be called a blocking garbage collection technique; otherwise, it may be called a non-blocking garbage collection technique. Obviously it is desirable to use a non-blocking garbage collection technique to decrease the disruptiveness of garbage collection in a managed runtime environment. Indeed, even if a mark-sweep garbage collector does not stop execution of any mutator, another difficulty with current mark-sweep garbage collection systems is that the marking phase for a garbage collection cycle cannot begin before the sweeping phase of the previous cycle is complete. To improve the overall performance of a managed runtime environment, it is desirable to improve not only the concurrency between mark-sweep garbage collection and execution of mutators, but the concurrency between the marking phase and the sweeping phase as well. Additionally, when there are multiple garbage collection threads, it is also desirable to increase the parallelism between different garbage collection threads.

BRIEF DESCRIPTION OF THE DRAWINGS

The features and advantages of the present invention will become apparent from the following detailed description of the present invention in which.

DETAILED DESCRIPTION

An embodiment of the present invention is a method and apparatus for improving the concurrency of mark-sweep garbage collection by using bit vector toggling. The present invention may be used to increase the opportunity for concurrency between the marking phase and the sweeping phase for mark-sweep garbage collection. The present invention may also be used to improve the parallelism among multiple garbage collection threads in a single or multi-processor system. Using the present invention, a storage space may be divided into multiple managed heap blocks. Each managed heap block may have a header area and a storage area. The storage area may store objects used by running mutators, while the header area may store information related to this block and objects stored in this block. The header area may contain two bit vectors, one being used for marking live objects and the other being used for sweeping the heap block. Once all live objects in the heap block are marked, the bit vector used for marking and the bit vector used for sweeping may be toggled, that is, the bit vector used for marking may now be used for sweeping, making the bit vector used for sweeping now available for marking in the next mark-sweep garbage collection cycle. By using separate bit vectors for marking and sweeping, live object tracing and storage space sweeping can proceed concurrently. Additionally, multiple garbage collection threads may be made to mark a heap block in parallel.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
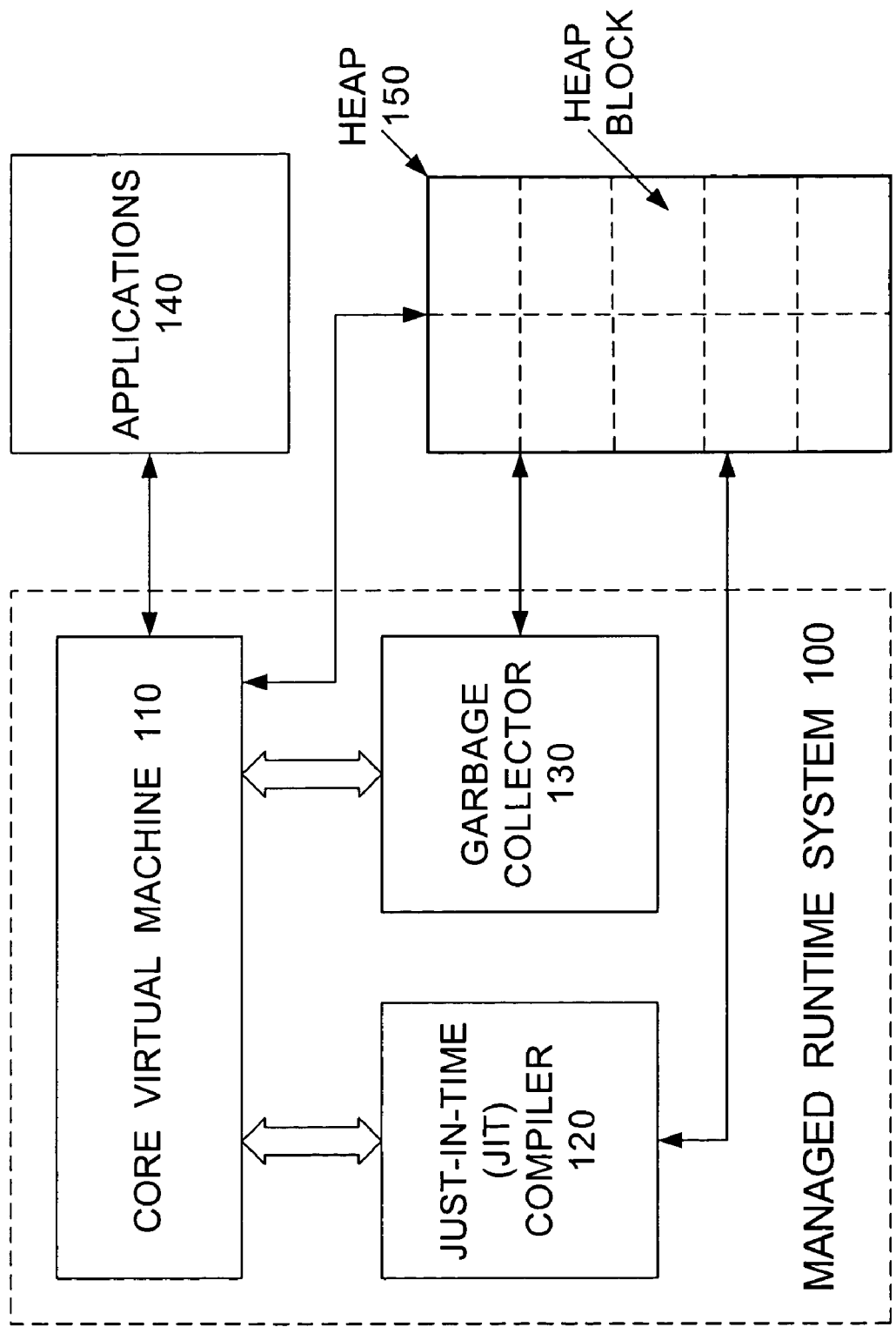
FIG. 1 depicts a high-level framework of an example managed runtime system that uses bit vector toggling to improve the concurrency of mark-sweep garbage collection, according to an embodiment of the present invention.

FIG. 1 depicts a high-level framework of an example managed runtime system that uses bit vector toggling to improve the concurrency of mark-sweep garbage collection, according to an embodiment of the present invention. The managed runtime system 100 may comprise a core virtual machine (VM) 110, at least one Just-In-Time (JIT) compiler 120, and a garbage collector 130. The core VM 110 is an abstract computing machine implemented in software on top of a hardware platform and operating system. The use of a VM makes software programs independent from different hardware and operating systems. A VM may be called a Java Virtual Machine (JVM) for Java programs, and may be referred to as other names such as, for example, Common Language Infrastructure (CLI) for C# programs. In order to use a VM, a program must first be compiled into an architecture-neutral distribution format, i.e., intermediate language such as, for example, bytecode for a Java code. The VM interprets the intermediate language and executes the code on a specific computing platform. However, the interpretation by the VM typically imposes an unacceptable performance penalty to the execution of an intermediate language code because of large runtime overhead processing. A JIT compiler has been designed to improve the VM's performance. The JIT compiler 120 compiles the intermediate language of a given method into a native code of the underlying machine before the method is first called. The native code of the method is stored in memory and any later calls to the method will be handled by this faster native code, instead of by the VM's interpretation.

The core virtual machine 110 may set applications 140 (or mutators) running and keep checking the level of free storage space while the applications are running. The mutators may be executed in multiple threads. Once free storage space falls below a threshold, the core virtual machine may invoke garbage collection, which may run in multiple threads and concurrently with execution of the mutators. First, all direct references (a root set) to objects from the currently executing programs may be found through root set enumeration. Root set enumeration may be performed by the core virtual machine 110 or the garbage collector 130. After a root set is obtained, the garbage collector may trace all live objects reachable from the root set across a storage space. The storage space may also be referred to as a heap 150, which may further comprise multiple smaller heap blocks as shown in FIG. 1. Live objects in the heap may be marked in a bit vector in a marking phase during live object tracing process. The bit vector may also be referred to as a mark bit vector. In one embodiment, a heap block may have its own mark bit vector for marking live objects in the heap block. This may help keep the size of the mark bit vector small so that it may be easier to load the mark bit vector into cache when necessary. In another embodiment, there may be only one mark bit vector for an entire heap for marking all live objects in the heap. Yet in another embodiment, there may be more than one mark bit vector for all heap blocks stored in a designated area in a heap. If there are multiple garbage collection threads, these threads may be made to be able to mark a mark bit vector in parallel.

Based on the information contained in a mark bit vector, a heap block or the heap may be swept to find all unmarked objects (garbage) and to make their space accessible to allocation routines. The sweeping phase may be conducted by a mutator. In one embodiment, the sweeping phase may share the same bit vector with the marking phase. With this arrangement, the marking phase and the sweeping phase may proceed sequentially. In another embodiment, a different bit vector (sweep bit vector) may be used for the sweeping phase. At the end of the marking phase, the mark bit vector and the sweep bit vector may be toggled, i.e., the mark bit vector may be used by the sweeping phase as a sweep bit vector and the sweep bit vector may be used by the live object tracing phase as a mark bit vector. By toggling the mark bit vector and the sweep bit vector, the sweeping phase may proceed concurrently with the marking phase, but using a mark bit vector set during the immediately preceding marking phase.

Figure 2:
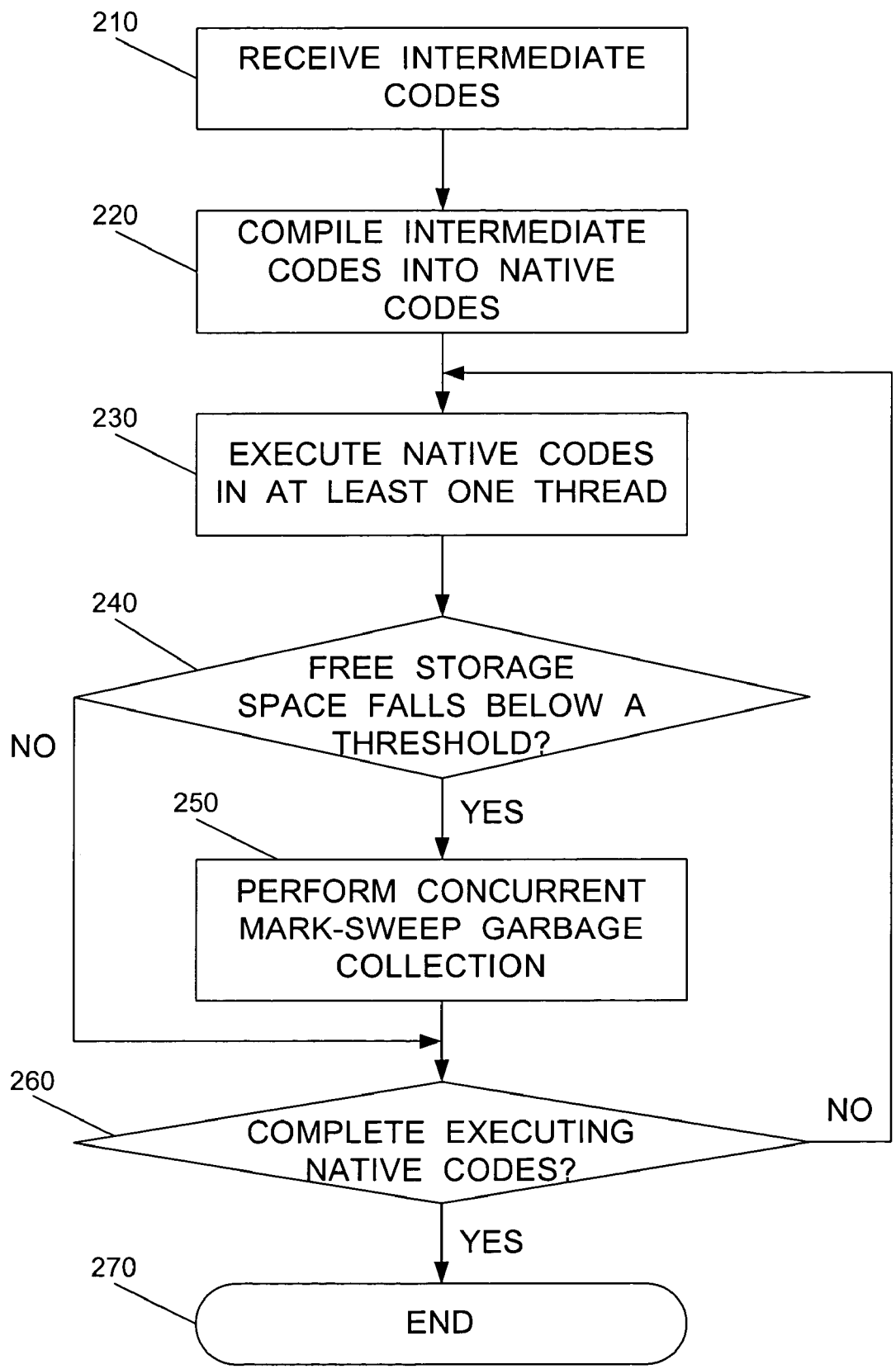
FIG. 2 is an exemplary flow diagram of a high-level process in which concurrent mark-sweep garbage collection using bit vector toggling is performed in a managed runtime system, according to an embodiment of the present invention.

FIG. 2 is an exemplary flow diagram of a high-level process in which concurrent mark-sweep garbage collection using bit vector toggling is performed in a managed runtime system, according to an embodiment of the present invention. At block 210, intermediate codes may be received by the VM. At block 220, the intermediate codes may be compiled into native codes by the JIT compiler. At block 230, the native codes may be set by the VM to run in one or more threads by one or more processors. At block 240, free storage space in a heap may be checked. If the free storage space in the heap falls below a threshold, concurrent mark-sweep garbage collection using bit vector toggling may be invoked and performed at block 250; otherwise, the execution progress of the native codes may be checked at block 260. If the native code execution is complete, the process for running the native codes may end at block 270; otherwise, the VM may continue executing the native codes by reiterating processing steps from block 230 to block 250.

Figure 3:
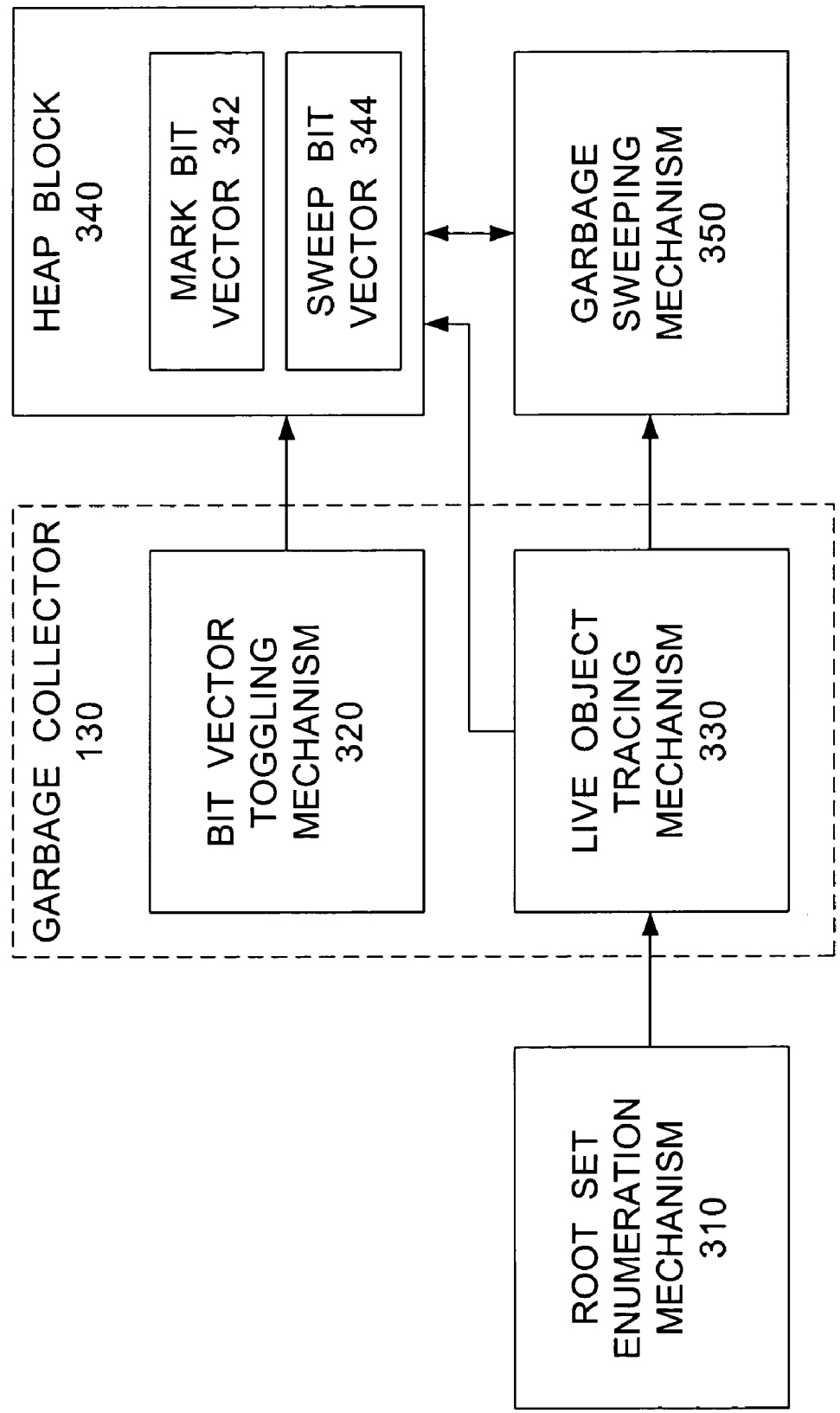
FIG. 3 is a high-level functional block diagram of components that are desired to achieve concurrent mark-sweep garbage collection, according to an embodiment of the present invention.

FIG. 3 is a high-level functional block diagram of components that are desired to achieve concurrent mark-sweep garbage collection, according to an embodiment of the present invention. Root set enumeration mechanism 310 may identify live references based on currently executing mutators. These live references together form a root set, from which all live objects may be traced. In one embodiment, the root set enumeration mechanism 310 may be part of the VM 110. In another embodiment, the root set enumeration mechanism 310 may be part of the garbage collector 130. For concurrent garbage collection, the root set might not include all live references at the time the root set is formed mainly because concurrently running mutators may create new live references while the root set enumeration mechanism is identifying live references. One way to prevent a garbage collector from reclaiming space occupied by live objects traceable from any newly created live reference during the root set enumeration process is to perform tri-color tracing, which will be described in FIG. 7.

The garbage collector 130 may comprise a live object tracing mechanism 330 and a bit vector toggling mechanism 320. The live object tracing mechanism 330 may mark and scan live objects in each heap block of a heap by traversing a graph of reachable data structures from the root set (hereinafter "reachability graph"). For a heap block 340, the live object tracing mechanism may set those bits corresponding to live objects in the heap block in a mark bit vector 342. Once all live objects in the heap block 340 are properly marked in the mark bit vector 342, i.e., all live objects in the heap block are marked and scanned and their corresponding bits in the mark bit vector are set, the mark bit vector 342 may be toggled with a sweep bit vector 344 by the bit vector toggling mechanism. After toggling, the previous mark bit vector becomes a sweep bit vector and the previous sweep bit vector becomes a mark bit vector. For a concurrent mark-sweep garbage collector, the reachability graph may change because running mutators may mutate the reachability graph while the live object tracing mechanism is tracing live objects. A tri-color tracing approach, which will be described in FIG. 7, may be used to coordinate with the live object tracing mechanism to ensure that no live objects are erroneously treated as garbage objects.

A garbage sweeping mechanism 350 may sweep the heap block 340 using the sweep bit vector (after the first garbage collection session, the sweep bit vector here is the most recently previous mark bit vector before toggling). The garbage sweeping mechanism may prepare storage space occupied by all garbage objects (objects other than live objects) and make the storage space ready for allocation by currently running mutators. In one embodiment, the garbage sweeping mechanism 350 may be a part of the garbage collector 130. In another embodiment, the garbage sweeping mechanism 350 may be a part of a mutator.

Figure 4:
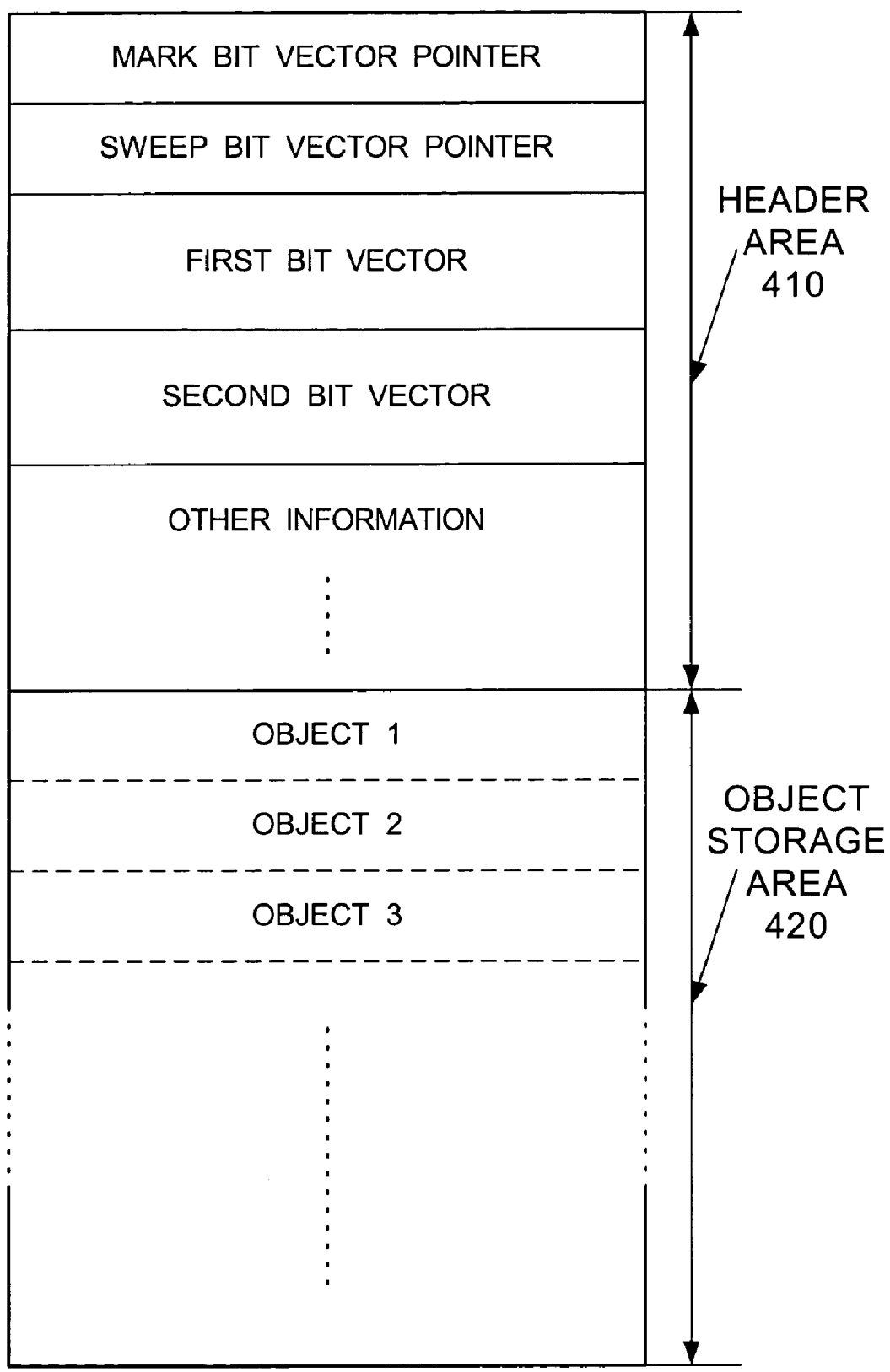
FIG. 4 is a schematic illustration of the structure of a heap block where bit vectors as well as objects are stored, according to an embodiment of the present invention.

A schematic illustration of the structure of a heap block is shown in FIG. 4. A heap block may comprise two areas: a header area 410 and an object area 420. The object storage area 420 may store objects used by mutators. The header area 410 may include a first bit vector, a second bit vector, a mark bit vector pointer, and a sweep bit vector pointer. When garbage collection is invoked for the first time, the first bit vector and the second bit vector may be initialized. For instance, each bit in either the first bit vector or the second bit vector may be set to zero after the initialization. In addition, one bit vector may be pointed to by the mark bit vector pointer and the other bit vector may be pointed to by the sweep bit vector pointer after the initialization. For example, the mark bit vector pointer may point to the first bit vector and the sweep bit vector pointer may point to the second bit pointer after the initialization. In this example, the first bit vector is used as the mark bit vector and the second bit vector is used as the sweep bit vector during the first cycle of garbage collection. The following is one exemplary data structure definition of a header area in a heap block, with only relevant fields shown.

```
struct block_header_info {
    uint8 *mark_bit_vector;
    uint8 *sweep_bit_vector;
    ...
    uint8 bit_vector_1st[XX];
    uint8 bit_vector_2nd[XX];
    ...
}
```

A mark bit vector pointed to by the mark bit vector pointer, e.g., the first bit vector during the first garbage collection cycle, is used to mark all live objects in the heap block 420. The number of bits in the mark bit vector may represent the number of total words in the object storage area 420. One word consists of 4 bytes on a 32-bit machine. Normally objects are word aligned, that is, an object in the object storage space 420 can only start at the beginning of a word. Therefore, bits in the mark bit vector can record every possible start of an object in the object storage area. For garbage collection purpose, only live objects in the object storage area are needed to be marked in the mark bit vector. For example, by setting a bit corresponding to the starting word of a live object to 1, the location of the live object in the object storage may be identified. Usually the first few words in an object are used to store general information about the object such as, for example, the size of the object. These first few words may be considered as a header of the object. By combining the starting word of the object contained in the mark bit vector and the size information contained in object header, the storage space occupied by this object may be identified. The correspondence between objects and bits in the mark bit vector may be illustrated in FIG. 5, according to an embodiment of the present invention. The object storage area 420 may comprise several live objects, for example, 510, 520, 530, and 540. Since the mark bit vector has one bit corresponding to each word of the object storage area 420, the starting word of a live object may be marked by setting the corresponding bit to a value (e.g., 1) different from a default value (e.g., 0). The default value is a value set for all bits in a mark bit vector and a sweep bit vector during the initialization when the first garbage collection cycle is invoked.

Figure 5:
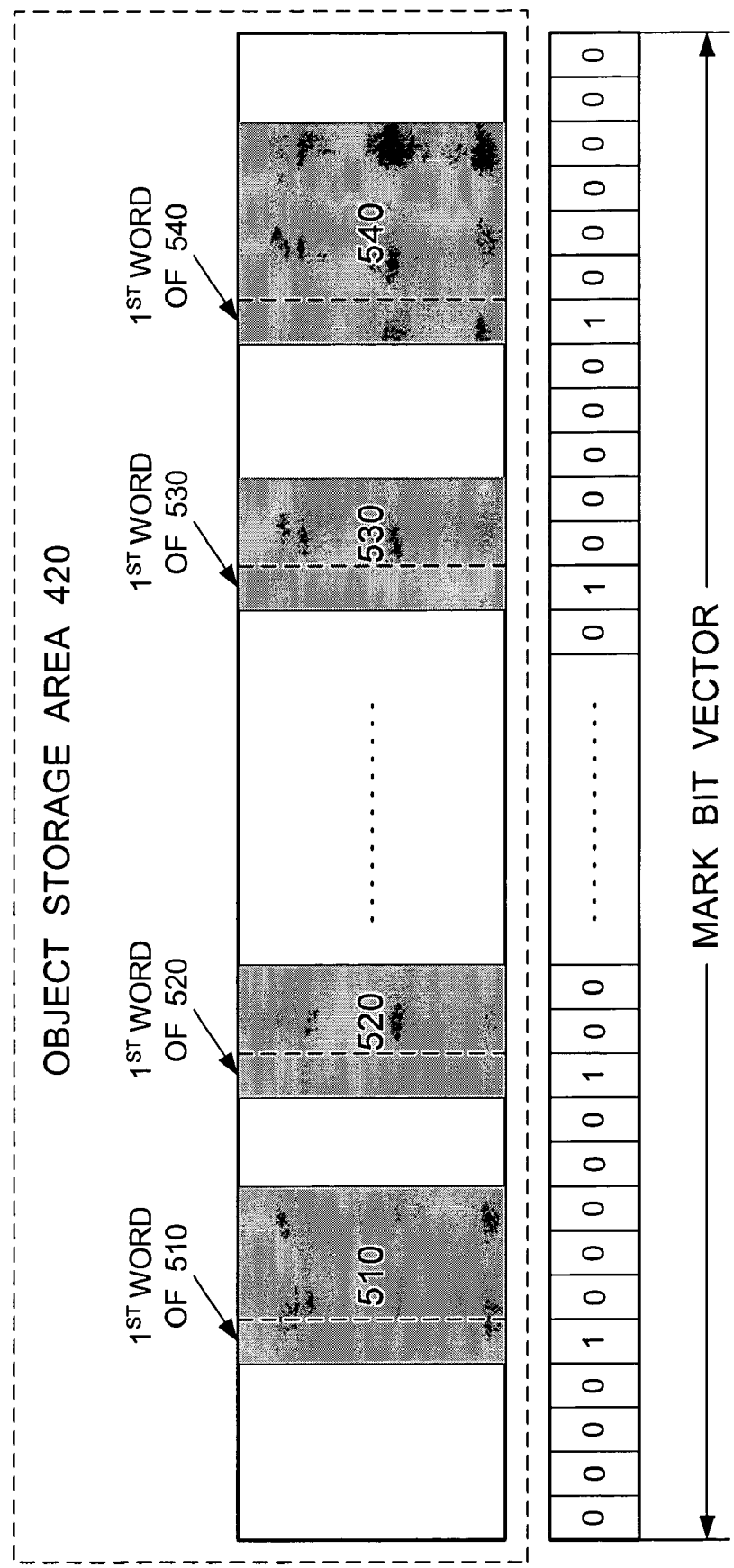
FIG. 5 is a schematic illustration of the correspondence between objects and mark bits in a heap block, according to an embodiment of the present invention.

FIG. 5 shows how live objects 510, 520, 530, and 540 are marked in the mark bit vector. Because of such a correspondence between a mark bit vector and each word in the object storage area and because the number of bits in a mark bit vector is the same as the number of bits in a sweep bit vector, a 64 k byte heap block may require 4 k bytes used as the header area and the rest of 60 k bytes used as the object storage area. A 60 k byte storage area consists of 15 k words on a 32-bit machine. Thus the number of bits in either the mark bit vector or the sweep bit vector is 15 k, or the size of the mark bit vector or the sweep bit vector is 1920 bytes. Put the mark bit vector and the sweep bit vector together, the total size for bit vectors is 3840 (2×1920) bytes. The address of an object in a 64 k byte heap block (on a 32-bit machine) may be converted into a bit index in a bit vector as follows,

```
int obj_bit_index = (p_obj & 0xFFFF) >> 2;
/* lower 16 bits of an object address, p_obj, are chosen and
   divide by 4 */.
Similarly, a bit index in a bit vector in a 64k byte heap block (on a 32-bit
machine) may be converted into the object address as follows,
    Object *p_obj = (Object *)((char *)block_address +
    (obj_bit_index * 4)).
```

Figure 6:
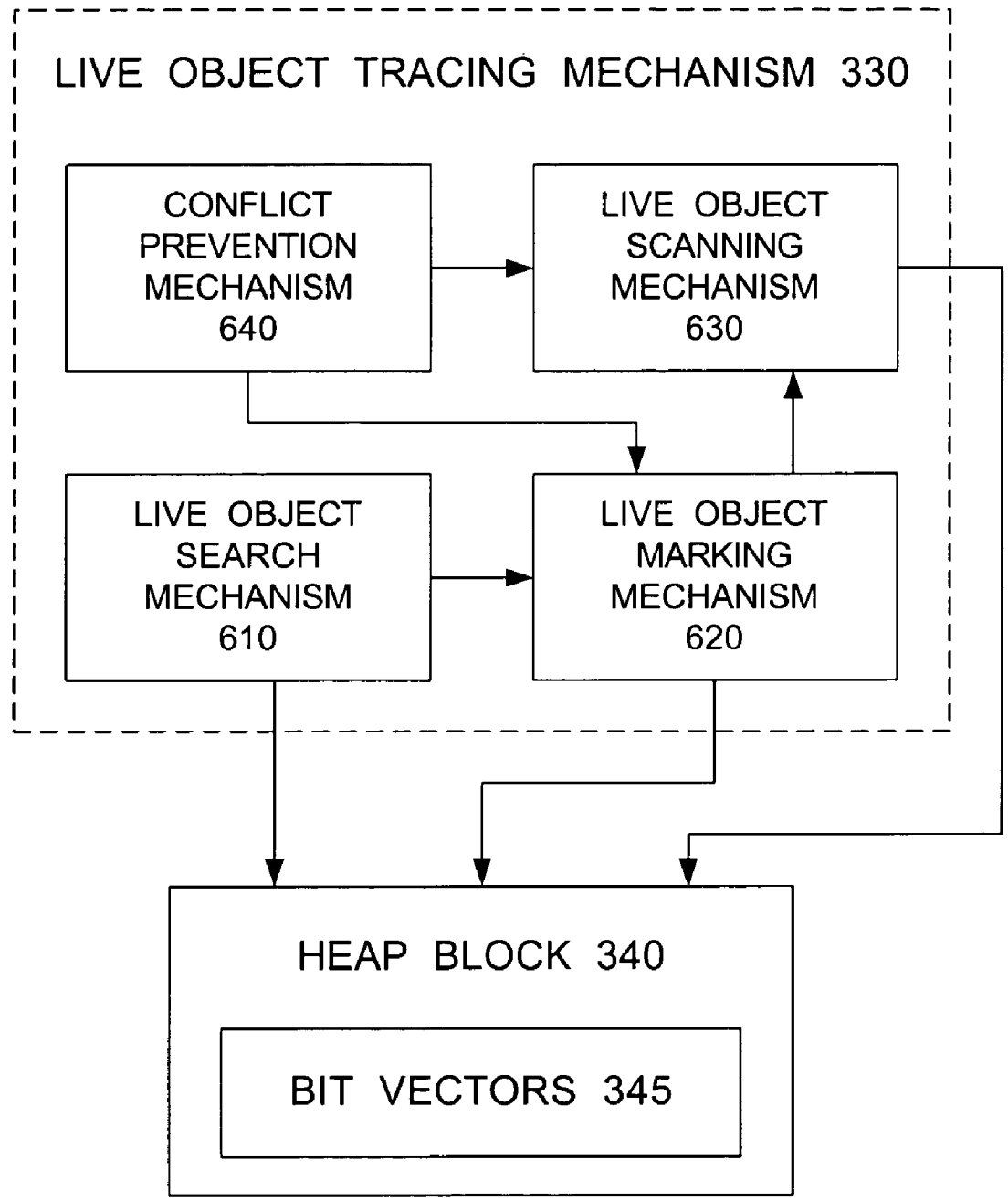
FIG. 6 is an exemplary functional block diagram of a live object tracing mechanism that performs concurrent marking functionality during concurrent mark-sweep garbage collection, according to an embodiment of the present invention.

FIG. 6 is an exemplary functional block diagram of a live object tracing mechanism 330 as shown in FIG. 3. The live object tracing mechanism 330 may comprise a live object search mechanism 610, a live object marking mechanism 620, a live object scanning mechanism 630, and a conflict prevention mechanism 640. The live object search mechanism 610 may search heap blocks in a heap for live objects by traversing the reachability graph. In one embodiment, all heap blocks in the entire heap may be searched for live objects, especially when the mark-sweep garbage collection is first invoked. In another embodiment, a portion of heap blocks in the heap may be searched for live objects. For example, only those heap blocks that have not been swept may be searched for live objects since it is not necessary to search heap blocks that have recently been swept for garbage collection purposes. The live object search mechanism may search the live objects while mutators stopped running in a blocking garbage collection system. In a non-blocking garbage collection system, however, the live object search mechanism may search the live objects while mutators are concurrently running. In the latter situation, the reachability graph may be mutated by mutators. When this happens, freed objects may or may not be reclaimed by the garbage collector and become floating garbage. This floating garbage will usually be collected in the next garbage collection cycle because it will be garbage at the beginning of the next cycle. The inability to reclaim floating garbage immediately may be unfavorable, but may be essential to avoiding expensive coordination between mutators and the garbage collector. If the reachability graph is mutated by mutators during the live object searching process, however, space not occupied by a live object may be occupied by a live object and is thus likely to be erroneously reclaimed. Such errors may be avoided by using a tri-color tracing approach, which will be described in FIG. 7.

The live object marking mechanism 620 may mark an object reachable from the root set. Before setting the corresponding bit in the mark bit vector for this object, this object may be further scanned by the live object scanning mechanism 630 to find any other objects that this object can reach. In a multiple thread garbage collection system, multiple threads of a garbage collector may mark and scan a heap block in parallel. The conflict prevention mechanism 640 may prevent the multiple threads from marking or scanning the same object at the same time. In other words, the conflict prevention mechanism may ensure that an object can only be successfully marked by one thread in a given garbage collection cycle, and the object is scanned exactly once thereafter by the very same thread. Since an object may simultaneously be seen as unmarked by two or more garbage collection threads, these threads could all concurrently try to mark the object. Measures may be taken to ensure that only one thread can succeed. In one embodiment, a byte level "lock cmpxchg" instruction, which swaps in a new byte if a previous value matches, may be used to prevent more than one thread from succeeding in marking an object. All threads may fail in marking the object, but these threads can retry until only one thread succeeds.

Figure 7:
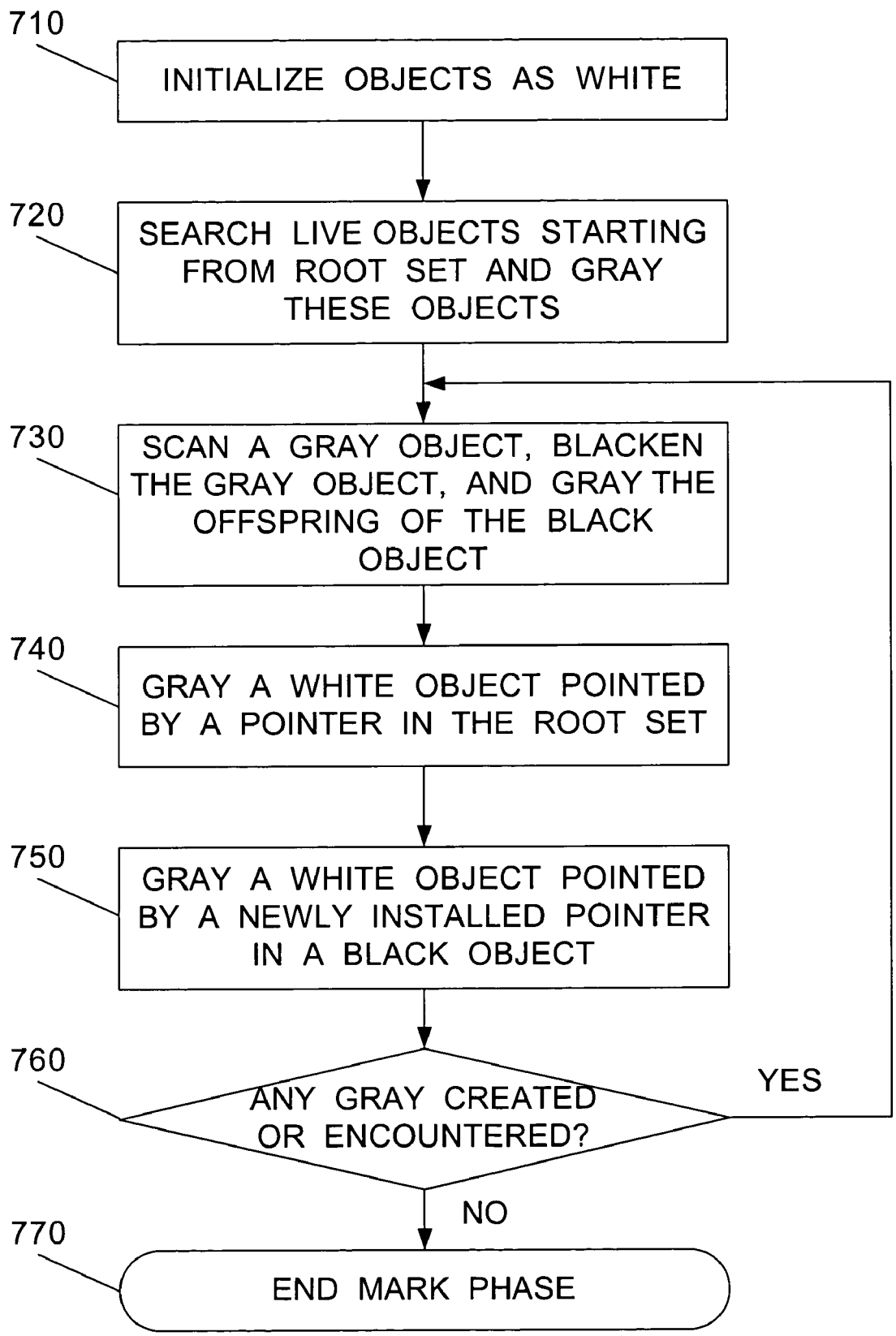
FIG. 7 is an exemplary flow diagram of a process of concurrent tracing in which a tri-color approach is used, according to an embodiment of the present invention.

FIG. 7 is an exemplary flow diagram of a process of concurrent marking in using a tri-color approach, according to one embodiment of the present invention. This flow diagram can also explain how the components in a live object tracing mechanism 330 as shown in FIG. 6 work together using a tri-color tracing approach. Under the tri-color tracing approach, white indicates an object that has not been reached or scanned, that is, an object subject to garbage collection; gray indicates an object that is reachable but has not been scanned, that is, an object that has been marked by the live object marking mechanism 620, but has not been scanned by the live object scanning mechanism 630; and black indicates an object that is reachable and has been scanned, that is, an object that has been marked by the live object marking mechanism and has been scanned by the live object scanning mechanism.

Before the tracing process starts, all objects may be initialized as white at step 710 in FIG. 7. At step 720, objects directly reachable from the root set may be searched and changed from white to gray. At step 730, each gray object may be scanned to discover its direct descendant white objects (these white objects are directly traceable from a gray object); when a gray object is scanned, the gray object may be blackened; the direct descendant white objects of the just blackened object may be colored gray; and the marking bit corresponding to the just blackened object in the mark bit vector may be set. At step 740, each white object pointed to by any pointers in the root set may be changed to gray. This step may be necessary for concurrent mark-sweep garbage collection since concurrently running mutators may add new references to the root set while steps 710 to 730 are performed. At step 750, a white objected pointed to by a newly installed in any black object may be changed to gray. Steps 740 and 750 may help prevent the garbage collector from erroneously reclaiming space occupied by a live object because of incorrect coordination between the concurrently running mutators and the garbage collector. At step 760, the reachability graph may be checked to determine if there are any gray objects created or encountered. If there is no gray object, the live object tracing process may be ended at step 770. If there are gray objects, steps 730 through 760 may be reiterated until there is no gray object created or encountered. As a result, all live objects are blackened and their corresponding marking bits in the mark bit vector are set after the live object tracing process.

The above described tri-color tracing approach may be perceived as if the traversal of the reachability graph proceeds in a wavefront of gray objects, which separates the white objects from the black objects that have been passed by the wave. In effect, there are no pointers directly from black objects to white objects, and thus mutators preserve the invariant that no black object holds a pointer directly to a white object. This ensures that no space of live objects is mistakenly reclaimed. In case a mutator creates a pointer from a black object to a white object, the mutator must somehow notify the collector that its assumption has been violated to ensure that the garbage collector's reachability graph is kept up to date. The example approaches to coordinating the garbage collector and a concurrently running mutator may involve a read barrier or a write barrier. A read barrier may detect when the mutator attempts to access a pointer to a white object, and immediately colors the object gray. Since the mutator cannot read pointers to white objects, the mutator cannot install them in black objects. A write barrier may detect when a concurrently running mutator attempts to write a pointer into an object, and trap or record the write.

Figure 8:
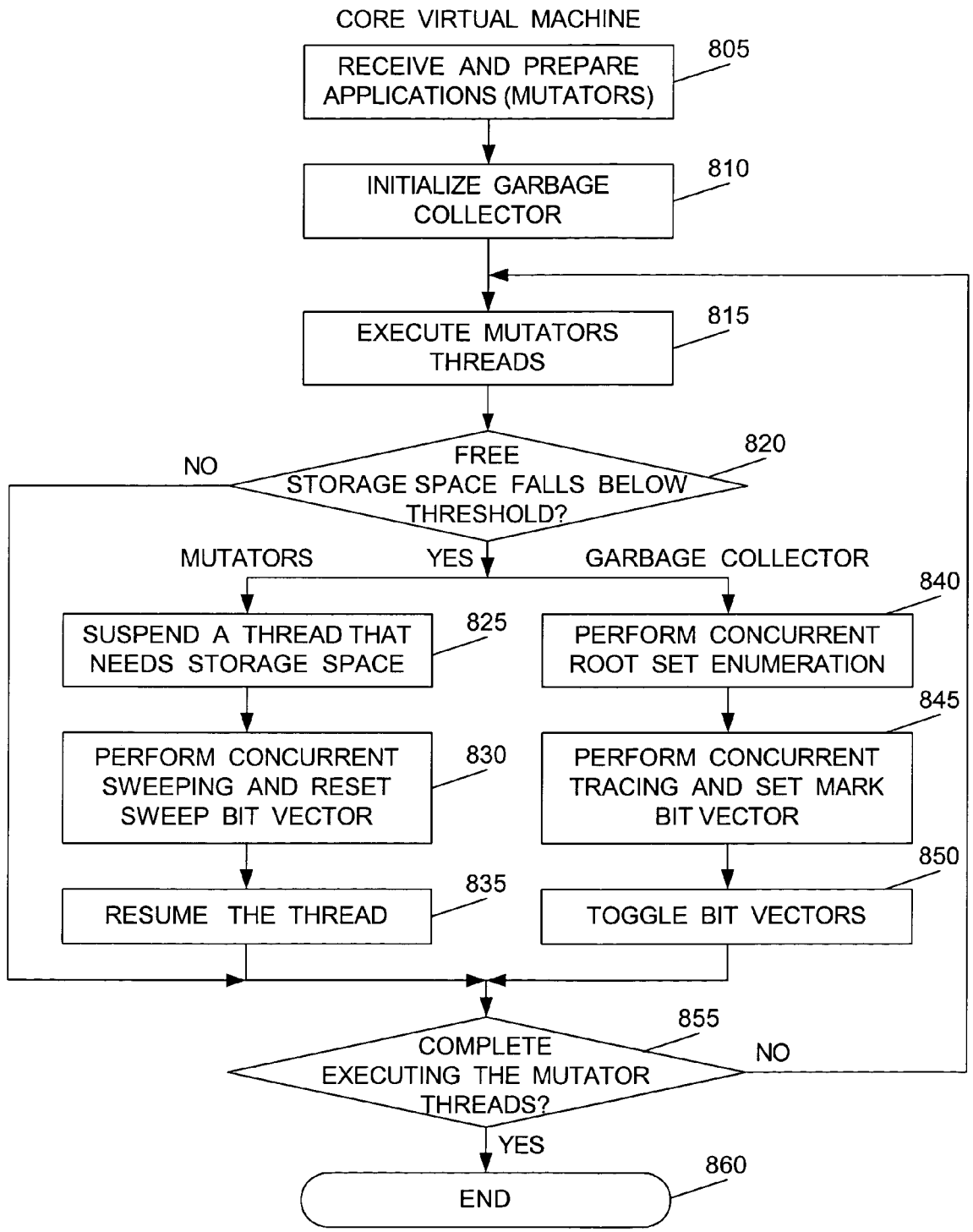
FIG. 8 is an exemplary flow diagram of a high-level process in which concurrent mark-sweep garbage collection is achieved by using a bit vector toggling technique, according to an embodiment of the present invention.

FIG. 8 is an exemplary flow diagram of a high-level process in which concurrent mark-sweep garbage collection is achieved by using a bit vector toggling technique, according to an embodiment of the present invention. At step 805, applications (mutators) may be received by the core VM and be passed to the JIT compiler for compiling. At step 810, the garbage collector may be initialized. The two bit vectors in each heap block may be set to zero, i.e., all bits in each bit vector are set to zero, and the mark bit vector pointer and the sweep bit vector pointer each may be pointed to one bit vector. At step 815, mutators may be set to run in one or multiple threads. At step 820, it may be determined whether the free storage space in the heap falls below a threshold. The threshold may be pre-determined and may be determined dynamically based on the types of running mutators, operating systems, hardware infrastructure, and/or any other related factors. In one embodiment, garbage collection initialization at step 810 may be performed after or right before step 820, without affecting the general performance of the system based on the present invention.

If at step 820, it is determined that the free storage space in the heap falls below the threshold, the mark-sweep garbage collection process may be invoked. The garbage collection may be running in more than one thread and may be running concurrently with mutators. While the mutators are performing steps 825 to 835, the garbage collection thread(s) may be performing steps 840 through 850 concurrently. At step 825, a mutator thread that needs storage space may be suspended while the garbage collector is making more storage space available by collection garbage objects. In one embodiment, the mutator thread might not need to be suspended. For example, if the threshold of the free storage space that triggers the garbage collection is not very low, there may still be enough free space in the heap for the mutator thread to use. At step 830, sweeping may be performed for some heap blocks and accordingly the sweep bit vectors in these heap blocks just swept may be reset (back to zero). When mark-sweep garbage collection is invoked for the first time, an initialized sweep bit vector (i.e., with all bits being zeros) may be used to sweep a heap block. In a later garbage collection cycle, the mark bit vector used in the last garbage collection cycle may be toggled with the sweep bit vector and used to sweep the heap block. After a heap block is swept, the sweep bit vector in the heap block may be reset so that the sweep bit vector may be toggled with the mark bit vector soon after the marking phase is completed for the heap block. At step 835, the mutator thread that was suspended at step 825 may be resumed, if the storage space released at step 830 is large enough for the need of the thread. Step 835 might not be needed if no thread has been suspended.

The garbage collector may be performing steps 840 to 850 concurrently with the mutators. At step 840, root set enumeration may be performed. In one embodiment, the root set enumeration may be performed by the core VM. In another embodiment, the root set enumeration may be performed by the garbage collector. Due to the concurrently running mutators, root sets obtained before and after the marking phase may be different. Live references that become dead before the sweeping phase might not cause much harm because they may only result in floating garbage, which will be reclaimed in the next garbage collection cycle. New references added by mutators after the root set enumeration but before the sweeping phase may cause greater harm because they may result in erroneous reclamation of live objects. In one embodiment, this problem may be solved by a root set re-enumeration phase just before the sweeping phase. The root set re-enumeration phase may update the root set collected before the marking phase. In another embodiment, the problem may be solved by utilizing a write barrier so that any newly created references may be trapped or recorded. Based on the information obtained through the write barrier, the root set may be updated. At step 845, concurrent tracing process may be performed. The tri-color tracing approach may be used during the concurrent tracing process. As a result of the concurrent tracing, bits in the mark bit vector in a heap block, corresponding to live objects in the heap block, may be set (to the value of 1). After the mark bit vector in a heap block is completely marked, the mark bit vector may be toggled with the sweep bit vector in the heap block at step 850. The toggling process may be simply done by pointing the mark bit vector pointer to the bit vector previously used for sweeping and by pointing the sweep bit vector pointer to the bit vector previously used for marking. In the next garbage collection cycle, the bit vector previously used for marking may be used for sweeping the heap block. This bit vector may be reset (back to zero) soon after the sweeping phase is completed so that a bit vector used for marking may always start with a zero bit vector (i.e., all bits in the vector are zeros). Because each heap block has two bit vectors, which are toggled with each other at the end of each tracing process, tracing and sweeping may be able to overlap and proceed concurrently.

At step 855, whether the mutator threads have completed executing may be determined. If all mutator threads have completed executing, it may be not necessary to run garbage collection and thus concurrent mark-sweep collection process may end at step 860. If, on the other hand, not all mutator threads have completed executing, process from steps 815 through 855 may be reiterated until all mutator threads complete their execution. For purposes of explanation, the concurrent mark-sweep garbage collection using bit vector toggling is described in the order shown above. It is apparent that persons of ordinary skill in the art will readily appreciate that many other methods of implementing the concurrent mark-sweep collection may alternatively be used. For example, the order of execution of the steps may be changed, and/or some of the steps in may be changed, eliminated, or combined.

Figure 9:
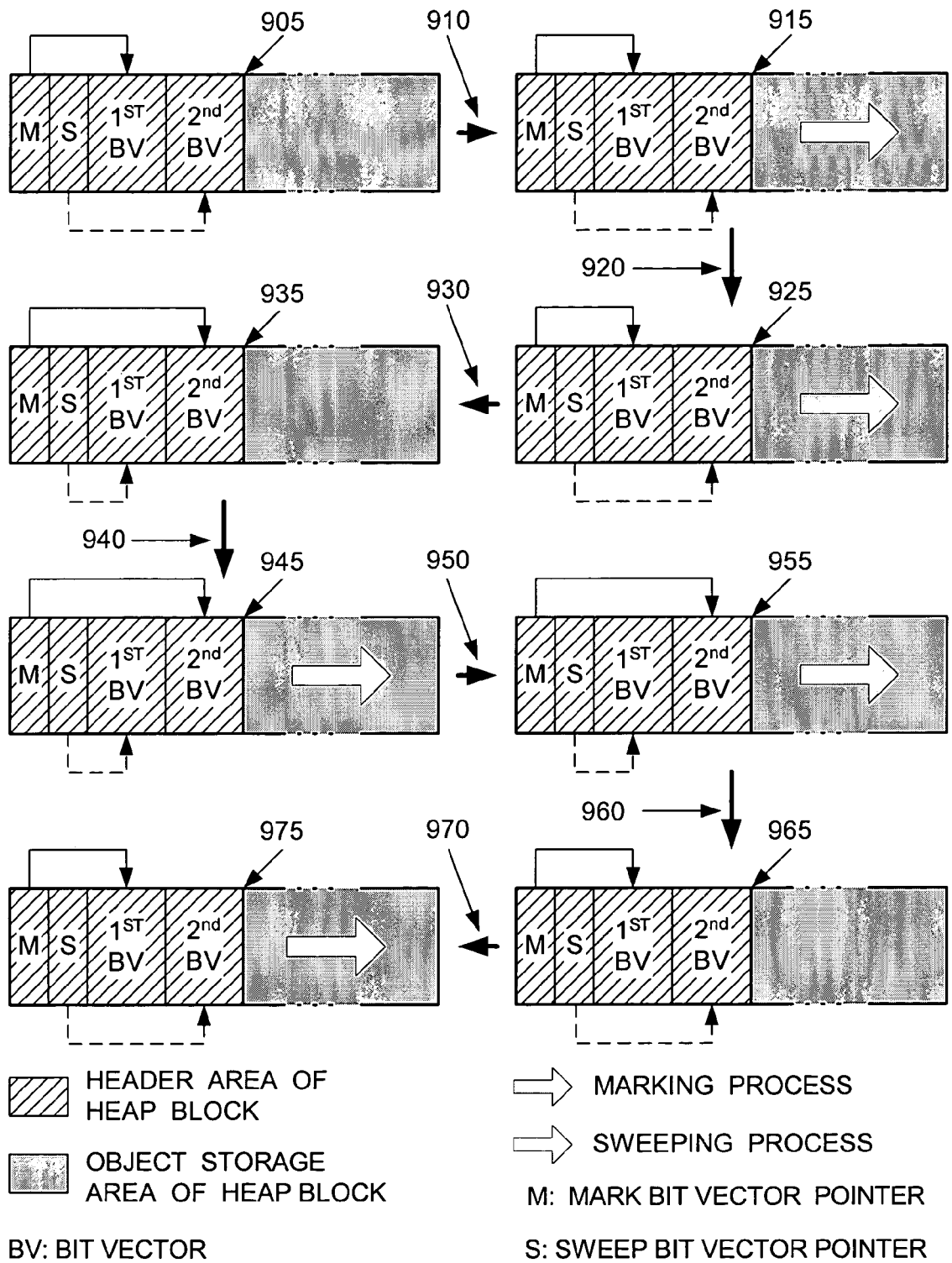
FIG. 9 is a schematic illustration of how a bit vector toggling technique can be used to achieve concurrent mark-sweep garbage collection, according to an embodiment of the present invention.

FIG. 9 is a schematic illustration of how a bit vector toggling technique can be used to achieve concurrent mark-sweep garbage collection, according to an embodiment of the present invention. At step 905, the garbage collector may be initialized. Both the first bit vector ($1^{st}$ BV) and the second bit vector ($2^{nd}$ BV) may be set to zero, i.e., all bits in each bit vector are set to zeros. The mark bit vector pointer (M) may be pointed to the $1^{st}$ BV and the sweep bit vector pointer (S) may be pointed to the $2^{nd}$ BV. At step 910, mutators may be set to run in one or multiple threads. At step 915, Sweeping may be performed (Since the sweep bit vector for the GC cycle 1 is a zero vector, there is not much to be done for the sweeping phase). When available free storage space in the heap falls below a particular threshold, the first garbage collection cycle (GC cycle 1) may be invoked at step 920. At step 925, garbage collection threads performing concurrent tracing may use the mark bit vector to mark an object in the heap block. The object may be marked by setting the "mark bit" corresponding to the address of the first word of that object in the mark bit vector of the heap block in which the base of the object is contained. An object may successfully be marked exactly by one thread in a given GC cycle, and may be scanned exactly once thereafter by this very same thread. Once there are no more objects to be marked, the marking phase may end at step 930. Mutator threads are concurrently running and allocating space for objects, while the marking phase is being performed. The mutator threads may still be using the old sweep vector, but this is safe since the objects marked as live in the old sweep vector is a superset of those marked live in the mark vector.

At step 935, the toggling phase may be performed. The pointer values of the mark bit vector and the sweep bit vector in the heap block may be swapped. As a result of toggling, M now points to the $2^{nd}$ BV and S now points to the $1^{st}$ BV. A mutator thread may continue using the old sweep vector for the heap block to avoid unnecessary interruption. Once it is determined, at step 940, a mutator thread runs out of space to allocate from, the mutator thread may grab a new heap block and concurrently sweep the heap block, at step 945, using the sweep bit vector, $1^{st}$ BV, the one that had been used by the immediately preceding concurrent marking phase of GC cycle 1. The $1^{st}$ BV may be reset (back to zero) once the sweeping phase is complete. To prevent other garbage collection threads from re-sweeping the heap block just swept, the garbage collector needs to inform other threads to switch to the new sweep bit vector if the other threads have not already done so.

Once the heap free space falls below the threshold again at step 950, a new garbage collection cycle (GC cycle 2) may be invoked. At step 955, the concurrent marking phase for the GC cycle 2 may use the mark bit vector, $2^{nd}$ BV, which has been reset by the preceding sweeping phase, to mark a heap block. The marking phase may proceed concurrently with mutator threads and may end at step 960 when there is no more live object to be marked. Note that concurrent sweeping and concurrent marking may be able to overlap and proceed concurrently in this period of time because two separate bit vectors in each heap block, one for marking and the other for sweeping, are used. At step 965, the mark bit vector and the sweep bit vector in the GC cycle 2 may be toggled. Once it is determined, at step 970, a mutator thread runs out of space to allocate from, the mutator thread may grab a new heap block and concurrently sweep the heap block, at step 975, using the sweep bit vector, $2^{nd}$ BV, the one that had been used by the immediately preceding concurrent marking phase of GC cycle 2. A new garbage collection cycle may be invoked if the heap free space falls below the threshold again, until all mutator threads have completed their execution.

Although the present invention is concerned with using bit vector toggling for mark-sweep garbage collection, persons of ordinary skill in the art will readily appreciate that the present invention may be used for improving the concurrency by other types of garbage collection such as, for example, mark-sweep-compact garbage collection, etc. Additionally, the present invention may be used for automatic garbage collection in any systems such as, for example, managed runtime environments running Java, C#, and/or any other programming languages.

Although an example embodiment of the present invention is described with reference to block and flow diagrams in FIGS. 1–9, persons of ordinary skill in the art will readily appreciate that many other methods of implementing the present invention may alternatively be used. For example, the order of execution of the functional blocks or process steps may be changed, and/or some of the functional blocks or process steps described may be changed, eliminated, or combined.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features, components, or modules were omitted, simplified, combined, or split in order not to obscure the present invention.

Embodiments of the present invention may be implemented on any computing platform, which comprises hardware and operating systems. The hardware may comprise a processor, a memory, a bus, and an I/O hub to peripherals. The processor may run a compiler to compile any software to the processor-specific instructions. Processing required by the embodiments may be performed by a general-purpose computer alone or in connection with a special purpose computer. Such processing may be performed by a single platform or by a distributed processing platform. In addition, such processing and functionality can be implemented in the form of special purpose hardware or in the form of software.

If embodiments of the present invention are implemented in software, the software may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

The invention claimed is:

1. A method for performing concurrent mark-sweep garbage collection, comprising:

receiving an application, the application including a software application to run concurrently with mark-sweep garbage collection;

executing the application in at least one thread, the application using space in a heap while being executed;

determining if available space in the heap falls below a threshold;

performing mark-sweep garbage collection, concurrently while executing the application, in a heap block of the heap using a first bit vector, a second bit vector, a mark bit vector pointer, and a sweep bit vector pointer in the heap block, if the available space falls below the threshold; and otherwise, continuing executing the application and monitoring if the available space in the heap falls below the threshold, until the execution of the application is complete;

wherein performing mark-sweep garbage collection includes invoking at least one garbage collection thread to trace and mark live objects in the heap block concurrently while executing the application; and wherein the mark bit vector pointer initially points to the first bit vector, the sweep bit vector pointer initially points to the second bit vector, and the first bit vector and the second bit vector are toggled with each other after a marking phase of the mark-sweep garbage collection completes.

2. The method of claim 1, wherein the heap comprises at least one heap block.

3. The method of claim 1, further comprising initializing a concurrent mark-sweep garbage collector.

4. The method of claim 3, wherein initializing the concurrent mark-sweep garbage collector comprises setting each bit in the first bit vector and the second bit vector to 0, and pointing the mark bit vector pointer to the first bit vector and the sweep bit vector pointer to the second bit vector.

5. The method of claim 1, wherein performing mark-sweep garbage collection further comprises:
reclaiming storage space occupied by objects other than the live objects in the block concurrently while tracing the live objects in the block and executing the application.

6. The method of claim 5, wherein tracing the live objects in the heap block comprises parallel marking the live objects by at least one garbage collection thread.

7. The method of claim 6, wherein parallel marking the live objects comprises setting bits corresponding to starting addresses of the live objects in a bit vector pointed to by the mark bit vector pointer to 1, by the at least one garbage collection thread.

8. The method of claim 5, wherein reclaiming the storage space occupied by objects other than the live objects in the heap block comprises sweeping the heap block to make the said storage space allocable by using a bit vector pointed to by the sweep bit vector pointer.

9. The method of claim 8, further comprising setting the bit vector back to 0 after completing sweeping the heap block.

10. The method of claim 1, further comprising performing another cycle of concurrent mark-sweep garbage collection when available space in the heap falls below the threshold again.

11. A method for automatically collecting garbage objects, comprising:
receiving a first code, the first code being neutral to a computing platform;
compiling the first code into a second code, the second code being native to the computing platform;
executing the second code in at least one thread by the computing platform; and
automatically performing mark-sweep garbage collection concurrently with the executing second code, to ensure there is storage space available for executing the second code;
wherein automatically performing mark-sweep garbage collection detects if available space in a heap falls below a threshold and invokes the concurrent mark-sweep garbage collection when the available space falls below the threshold by using a first bit vector, a second bit vector, a mark bit vector pointer, and a sweep bit vector pointer for a heap, the mark bit vector pointer initially pointing to the first bit vector, the sweep bit vector pointer initially pointing to the second bit vector, and the first bit vector and the second bit vector being toggled with each other after a marking phase of the mark-sweep garbage collection completes.

12. The method of claim 11, wherein the heap comprises at least one heap block.

13. A system for concurrent mark-sweep garbage collection, comprising:
a root set enumeration mechanism to enumerate references to live objects in a heap;
a live object tracing mechanism to parallel trace live objects in a heap block and mark the live objects in a first bit vector pointed to by a mark bit vector pointer in the heap block, concurrently with execution of an application, the application using space in the heap while being executed, the live object tracing mechanism including a live object search mechanism to parallel search live objects in the heap block by at least one garbage collection thread, and a live object marking mechanism to parallel mark the live objects in a bit vector stored in the heap block by the at least one garbage collection thread;
a garbage sweeping mechanism to sweep storage space occupied by garbage objects to make the storage space allocable using a second bit vector pointed to by a sweep bit vector pointer in the heap block, concurrently with the execution of the application and live object marking; and
a bit vector toggling mechanism to toggle the first bit vector pointed to by the mark bit vector pointer and the second bit vector pointed to by the sweep bit vector pointer in the heap block.

14. The system of claim 13, wherein the live object tracing mechanism further comprises:
a live object scanning mechanism to parallel scan any objects reachable from the live objects in the heap; and
a conflict prevention mechanism to prevent more than one garbage collection thread from marking the same object.

15. A system for managing memory usage during runtime, comprising:
a just-in-time compiler to compile an application into a code native to an underlying computing platform;
a virtual machine to execute the application, the application using space in a heap while being executed; and
a garbage collector to trace live objects, mark the live objects in a first bit vector pointed to by a mark bit vector pointer in a heap block of the heap, and toggle the bit first vector pointed to by the mark bit vector pointer with a second bit vector pointed to by a sweep bit vector pointer at the end of marking phase, concurrently with execution of the application, the garbage collector including a live object marking mechanism to parallel mark the live objects in the first bit vector pointed to by the mark bit vector in the heap block of the heap, and a bit vector toggling mechanism to toggle the first bit vector pointed to by the mark bit vector pointer and the second bit vector pointed to by the sweep bit vector pointer.

16. The system of claim 15, further comprising a garbage sweeping mechanism to sweep storage space occupied by garbage objects to make the storage space allocable using a bit vector pointed to by the sweep bit vector pointer, concurrently with the execution of the application and live objects marking.

17. An article comprising: a machine accessible medium having content stored thereon, wherein when the content is accessed by a processor, the content provides for performing concurrent mark-sweep garbage collection by:

receiving an application, the application including a software application to run concurrently with mark-sweep garbage collection;

executing the application in at least one thread, the application using space in a heap while being executed;

determining if available space in the heap falls below a threshold;

performing mark-sweep garbage collection, concurrently while executing the application, in a heap block of the heap using a first bit vector, a second bit vector, a mark bit vector pointer, and a sweep bit vector pointer in the heap block, if the available space falls below the threshold; and otherwise, continuing executing the application and monitoring if the available space in the heap falls below the threshold, until the execution of the application is complete;

wherein performing mark-sweep garbage collection includes invoking at least one garbage collection thread to trace and mark live objects in the heap block concurrently while executing the application; and wherein the mark bit vector pointer initially points to the first bit vector, the sweep bit vector pointer initially points to the second bit vector, and the first bit vector and the second bit vector are toggled with each other after a marking phase of the mark-sweep garbage collection completes.

18. The article of claim 17, wherein the heap comprises at least one heap block.

19. The article of claim 17, further comprising content for initializing a concurrent mark-sweep garbage collector.

20. The article of claim 19, wherein content for initializing the concurrent mark-sweep garbage collector comprises content for setting each bit in the first bit vector and the second bit vector to 0, and pointing the mark bit vector pointer to the first bit vector and the sweep bit vector pointer to the second bit vector.

21. The article of claim 17, wherein content for performing mark-sweep garbage collection further comprises content for:

reclaiming storage space occupied by objects other than the live objects in the block concurrently while tracing the live objects in the block and executing the application.

22. The article of claim 21, wherein content for tracing the live objects in the heap block comprises content for parallel marking the live objects by at least one garbage collection thread.

23. The article of claim 22, wherein content parallel marking the live objects comprises content for setting bits corresponding to starting addresses of the live objects in a bit vector pointed to by the mark bit vector pointer to 1, by the at least one garbage collection thread.

24. The article of claim 21, wherein content for reclaiming the storage space occupied by objects other than the live objects in the heap block comprises content sweeping the heap block to make the said storage space allocable by using a bit vector pointed to by the sweep bit vector pointer.

25. The article of claim 24, further comprising content for setting the bit vector back to 0 after completing sweeping the heap block.

26. The article of claim 17, further comprising content performing another cycle of concurrent mark-sweep garbage collection when available space in the heap falls below the threshold again.

27. An article comprising: a machine accessible medium having content stored thereon, wherein when the content is accessed by a processor, the content provides for automatically collecting garbage objects by:

receiving a first code, the first code being neutral to a computing platform;

compiling the first code into a second code, the second code being native to the computing platform;

executing the second code in at least one thread by the computing platform; and automatically performing mark-sweep garbage collection concurrently with the executing second code, to ensure there is storage space available for executing the second code;

wherein automatically performing mark-sweep garbage collection detects if available space in a heap falls below a threshold and invokes the concurrent mark-sweep garbage collection when the available space falls below the threshold by using a first bit vector, a second bit vector, a mark bit vector pointer, and a sweep bit vector pointer for a heap, the mark bit vector pointer initially pointing to the first bit vector, the sweep bit vector pointer initially pointing to the second bit vector, and the first bit vector and the second bit vector being toggled with each other after a marking phase of the mark-sweep garbage collection completes.

28. The article of claim 27 wherein the heap comprises at least one heap block.

* * * * *